Patented Sept. 28, 1948

2,449,995

UNITED STATES PATENT OFFICE 2,449,995

PREPARATION OF ESTERS OF ALPHA BETA UNSATURATED CARBOXYLIC ACIDS

Thomas L. Gresham and Forrest W. Shaver, Akron, Ohio, assignors to The B. F. Goodrich Company, New York, N. Y., a corporation of New York No Drawing. Application November 28, 1945, Serial No. 631,498

5 Claims. (Cl. 260—486)

This invention relates to the preparation of esters of alpha-beta unsaturated carboxylic acids such as the alkyl acrylates, and is particularly concerned with the preparation of such compounds by the reaction of a beta-lactone with a dialkyl sulfate.

It is disclosed in U. S. Patents 2,352,641 and 2,376,704 to Frederick E. Küng that esters of alpha-beta unsaturated carboxylic acids such as the alkyl acrylates may be prepared from a beta-lactone (that is, a lactone or inner ester of a beta-hydroxy carboxylic acid) having a hydrogen atom connected to its alpha carbon atom, by heating the beta-lactone with an alkyl alcohol in the presence of a dehydration catalyst such as sulfuric acid, and then distilling the product. This reaction apparently proceeds through the formation of a beta-alkoxy carboxylic acid from the beta-lactone and the alcohol, and the dehydration and rearrangement of the beta-alkoxy acid to the unsaturated alkyl ester. When carried out using beta-propiolactone (also called hydracrylic acid lactone) methanol and sulfuric acid, for example, methyl acrylate is obtained in about 50% yields.

We have discovered that much higher yields of alkyl esters of alpha-beta unsaturated carboxylic acids are obtained from such beta-lactones by reacting the beta-lactone with a dialkyl sulfate. In this event a beta-alkoxy carboxylic acid is apparently not the first-formed reaction product, but rather the reaction is believed to proceed through an unisolated ester intermediate as represented by the following general equation:

high yields of the desired ester whenever the reactants are brought into effective contact with one another. It is preferable however, in order to control the reaction in such a manner that highest yields of the ester may be isolated as such from the reaction mixture, to add one of the reactants to the other reactant while maintaining the temperature of the reaction mixture below about 30° C., preferably from about —30 to 10° C., and then to separate the ester formed by distillation. Since many alkyl esters of alpha-beta unsaturated acids polymerize quite readily, it is often desirable to add a polymerization inhibitor such as hydroquinone to the ester during distillation to prevent its polymerization. If water is added to the reaction mixture, hydrolysis of the alkyl sulfuric acid formed to sulfuric acid and alkyl alcohol, and also partial hydrolysis of the ester formed to the corresponding alpha-beta unsaturated acid, will occur, and on distillation, both the unsaturated acid and the alkyl ester thereof are obtained.

Any other procedure for reacting a beta-lactone and a dialkyl sulfate also produces an alkyl ester of an alpha-beta unsaturated acid. For example, when a mixture of beta-lactone and dialkyl sulfate is refluxed in a solvent such as an alkyl alcohol having the same alkyl group as the dialkyl sulfate or an inert solvent for the reactants such as benzene, and the reaction mixture separated as by distillation, an alkyl ester of an alpha-beta unsaturated acid is secured. In this event, the temperature of reaction is the reflux temperature of the solvent; hence it is apparent

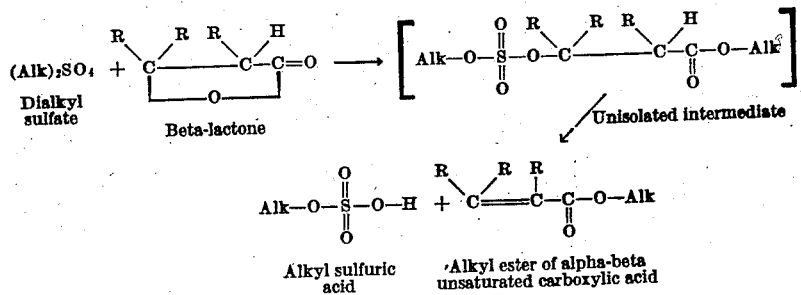

wherein Alk represents an alkyl radical and R represents hydrogen or a substituent radical.

This reaction does not require any special conditions since it proceeds quite rapidly to produce that the reaction occurs at temperatures considerably above room temperature and as high as 100° C. or higher.

Equimolecular proportions of the beta-lactone and the dialkyl sulfate are generally employed since there is no particular advantage in using an excess of either of the reactants. Such an excess, however, may be present if desired.

To illustrate the invention in specific detail, 72 parts by weight (63 parts by volume; 1 mole) of beta-propiolactone are slowly added to 126 parts by weight (95 parts by volume; 1 mole) of dimethyl sulfate over a period of three hours, keeping the reaction mixture well stirred and at a temperature of about 0 to 5° C. The reaction mixture is stirred for an additional hour and then distilled. The distillate consists of 74 parts by weight (86% yield) of substantially pure methyl acrylate.

When this procedure is repeated using diethyl sulfate instead of dimethyl sulfate, a 72% yield of ethyl acrylate is obtained. Similarly, when repeated using di-isopropyl sulfate, dibutyl sulfate, diamyl sulfate, di n-octyl sulfate or any other dialkyl sulfate, the corresponding alkyl acrylate is obtained in about 70 to 90% yield.

In another specific procedure, 75 parts by weight of diethyl sulfate are slowly added to 34 parts by weight of beta-propiolactone in a reaction vessel cooled in an ice bath. The reaction mixture is removed from the ice bath whereupon it spontaneously begins to boil. About 5 parts by weight of water are then added and the mixture distilled under vacuum. The crude distillate is stabilized by addition of a small amount of hydroquinone, washed and dried and then redistilled. The distillate consists of a 67% yield of ethyl acrylate and a 19% yield of acrylic acid. Similarly, other alkyl acrylates are secured when other dialkyl sulfates are substituted for diethyl sulfate in this procedure.

The reaction of dialkyl sulfates with beta-propiolactone (the simplest possible beta-lactone) to produce alkyl acrylates is the preferred embodiment of the invention because of the low cost of beta-propiolactone and the high yields of alkyl acrylates (which are particularly useful unsaturated esters) thereby obtained. However, other useful embodiments, wherein dialkyl acrylates are reacted with other beta-lactones having a hydrogen atom on the alpha carbon atom to produce other alkyl esters of alpha-beta unsaturated acids, are also included in the generic invention herein disclosed. For example, when beta-butyrolactone is reacted with a dialkyl sulfate in the same manner as disclosed hereinabove, an alkyl crotonate is obtained in good yield. Similarly, with beta-isobutyrolactone the product is an alkyl methacrylate; with beta-isovalerolactone the product is an alkyl ester of beta-beta-dimethyl acrylic acid; with alpha-ethyl-beta-propiolactone the product is an alkyl ester of alpha-ethacrylic acid and with other saturated aliphatic beta-lactones (i. e. homologs of beta-propiolactone) having hydrogen on the alpha carbon atom the products are other alkyl esters of alpha-beta unsaturated acids homologous with acrylic acid. Other lactones of beta-hydroxy monocarboxylic acids having at least one hydrogen on the alpha carbon atom and having cycloalkyl, aryl or aralkyl groups also present, such as beta-cyclohexyl-beta-propiolactone, beta-phenyl-beta-propiolactone, beta-benzyl-beta-propiolactone and alpha-phenyl-beta-propiolactone, are also utilizable as the beta-lactone reactant, a solvent preferably being present in this case. All of the above-mentioned beta-lactones are of the general structure

wherein R is hydrogen or an unreactive hydrocarbon group (i. e., a hydrocarbon group free from aliphatic unsaturation) and may be prepared in the manner described in U. S. Patent 2,356,459 to Frederick E. Küng. Still other beta-lactones having at least one hydrogen on the alpha carbon atom are known and are also contemplated by this invention. Among these are beta-lactones of unsaturated beta-hydroxy carboxylic acids, mono-beta-lactones of dicarboxylic acids and dilactones of dicarboxylic acids in which at least one of the lactones is beta examples of which includes beta-beta-dimethyl-beta-propiolactone - alpha - carboxylic acid and the beta-delta-dilactone of citrylidene malonic acid, all of which, like the beta-lactones before mentioned, are, except for carbonoxy structure $$\begin{pmatrix} C-O \\ \parallel \\ O \end{pmatrix}$$

composed exclusively of hydrogen and carbon atoms. Still other beta-lactones containing hydrogen on the alpha-carbon atom also contain, in addition to carbonoxy structure and hydrogen and carbon atoms, other elements such as oxygen, nitrogen, sulfur and halogen present in essentially unreactive structure such as nitro groups and ether linkages or in radicals containing reactive hydrogen such as amino and hydroxy. Examples of such latter beta-lactones include alpha or beta-nitrophenyl-beta-propiolactone; beta-(o-nitro-m-chlorophenyl) - beta - propiolactone; beta-(o-nitro-m-methoxyphenyl) - beta - propiolactone; alpha-hydroxy-beta-phenyl - beta - propiolactone and alpha-chloro-beta-propiolactone.

It is thus seen that the invention includes the reaction of any of the generic class of beta-lactones having at least one hydrogen atom connected to the alpha carbon atom with any of the generic class of dialkyl sulfates to form alkyl esters of alpha-beta unsaturated acids, in accordance with the general equation set forth hereinabove. Accordingly, it is not intended that the invention be limited to the specific details described herein, but only as defined by the spirit and scope of the appended claims.

We claim:

1. The method of preparing an alkyl ester of an alpha-beta unsaturated carboxylic acid which comprises bringing a dialkyl sulfate in which the two alkyl groups are identical and contain from 1 to 8 carbon atoms, and a beta-lactone of the formula

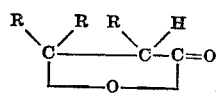

wherein each R is a member of the class consisting of hydrogen and alkyl, cyclo-alkyl, aryl and aralkyl hydrocarbon radicals containing less than 8 carbon atoms, into reactive contact with one another at a temperature below about 30° C. and then distilling the reaction mixture.

2. The method of preparing an alkyl acrylate which comprises admixing a dialkyl sulfate in which the two alkyl groups are identical and contain from 1 to 8 carbon atoms, and beta-propiolactone at a temperature below about 30° C., and then distilling the reaction mixture.

3. The method of preparing methyl acrylate which comprises admixing dimethyl sulfate and beta-propiolactone at a temperature of about −30 to 10° C., and then distilling the reaction mixture.

4. The method of preparing ethyl acrylate which comprises admixing diethyl sulfate and beta-propiolactone at a temperature of about −30 to 10° C., and then distilling the reaction mixture.

5. The method of preparing an alkyl acrylate which comprises adding beta-propiolactone to a dialkyl sulfate in which the two alkyl groups are identical and contain from 1 to 8 carbon atoms at a temperature of about −30 to 10° C., and then distilling the reaction mixture.

THOMAS L. GRESHAM.
FORREST W. SHAVER.

REFERENCES CITED

The following references are of record in the file of this patent:

UNITED STATES PATENTS

| Number | Name | Date |
| --- | --- | --- |
| 2,352,641 | Kung I | July 4, 1944 |
| 2,376,704 | Kung II | May 22, 1945 |